US012668375B2

(12) United States Patent
Aharoni et al.

(10) Patent No.: US 12,668,375 B2
(45) Date of Patent: Jun. 30, 2026

(54) SYSTEM FOR SELECTING AND CHARGING UAVS ACCORDING TO MISSIONS

(71) Applicant: STRIX DRONES LTD, Neve Yarak (IL)

(72) Inventors: Niv Aharoni, Neve Yarak (IL); Maoz Klein, Tel Aviv (IL)

( * ) Notice: Subject to any disclaimer, the term of this patent is extended or adjusted under 35 U.S.C. 154(b) by 657 days.

(21) Appl. No.: 18/099,985

(22) Filed: Jan. 23, 2023

(65) Prior Publication Data

US 2024/0246697 A1     Jul. 25, 2024

(51) Int. Cl.
B60L 53/14 (2019.01)
B60L 3/00 (2019.01)
B64F 1/36 (2017.01)
*B64C 39/02* (2023.01)
*B64U 50/37* (2023.01)

(52) U.S. Cl.
CPC ............ B64F 1/362 (2013.01); B60L 3/0046 (2013.01); B60L 53/14 (2019.02); *B60L 2200/10* (2013.01); *B64C 39/024* (2013.01); *B64U 50/37* (2023.01)

(58) Field of Classification Search
CPC .............................. B60L 53/14; H02J 7/00032

USPC ........................................................ 320/109
See application file for complete search history.

(56) References Cited

U.S. PATENT DOCUMENTS

| | | | |
|---|---|---|---|
| 11,654,794 B1 * | 5/2023 | Khattar | B64U 50/19 |
| | | | 244/6 |
| 2017/0217326 A1 * | 8/2017 | Nishi | B60L 58/13 |
| 2022/0239101 A1 * | 7/2022 | Nakamura | B60L 53/65 |
| 2024/0004403 A1 * | 1/2024 | Alagic | G05D 1/0297 |
| 2024/0193626 A1 * | 6/2024 | Cancino | G06Q 30/0202 |

* cited by examiner

*Primary Examiner* — Nathaniel R Pelton

(57) ABSTRACT

A system for selecting an unmanned aerial vehicle for executing a certain mission from a plurality of unmanned aerial vehicles that are available to perform the mission and for charging the battery of the selected vehicle with a specific abnormal charging profile, that includes a landing platform, an electric charger, a database stored on a memory means that includes information regarding past charges including past abnormal charges of the vehicles, a computer processing controller for controlling the charger and for determining the specific abnormal charging profile to charge the selected vehicle. The computer processing controller selects the selected vehicle from the plurality of vehicles that are available to perform the mission according to the information of past charges including past abnormal charges of the vehicles.

2 Claims, 1 Drawing Sheet

7
100

110

3
1
2
6  4  5

100
100
100
100

200

100

SYSTEM FOR SELECTING AND CHARGING UAVS ACCORDING TO MISSIONS

TECHNICAL FIELD

The present invention relates to a system for selecting an unmanned aerial vehicle for executing a certain mission from a plurality of unmanned aerial vehicles and for charging the battery of the selected vehicle with a specific abnormal charging profile based on the history of abnormal charges of those available vehicles.

PRIOR ART

The use of unmanned aerial vehicles is increasing and requires innovations and solutions for managing the usage of the vehicles based on the conditions of the batteries of the vehicles. The present invention discloses a good and efficient solution for such need.

THE INVENTION

Figure 1:
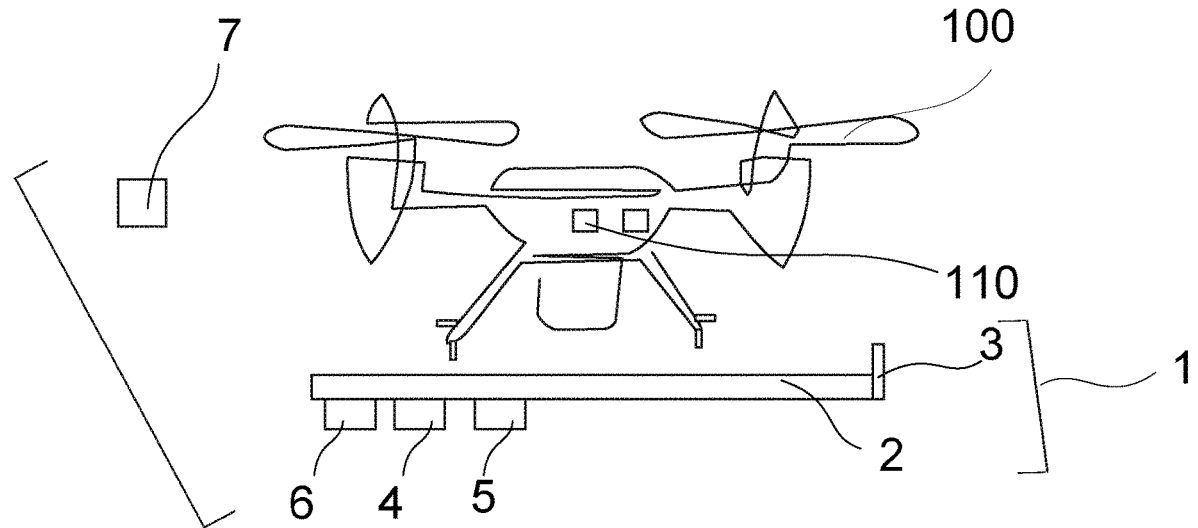
FIG. 1 depicts schematically the system with the landing platform and an unmanned aerial vehicle.

The main objective of the present invention is to provide a system (1) for selecting an unmanned aerial vehicle (100) for executing a certain mission from a plurality of unmanned aerial vehicles (200) that are available to perform the certain mission and for charging the battery (110) of the selected unmanned aerial vehicle with a specific abnormal charging profile.

When there is a mission to perform that can be done by one unmanned aerial vehicle out of a plurality of available unmanned aerial vehicles, then the choice of the vehicle to perform the mission is likely to be arbitrary or random without any particular preference. However, if there is a need for abnormal electric charging of the vehicle's battery that is chosen to perform the mission, then the system subject matter of the present invention takes into account the abnormal electric charging history of the available unmanned aerial vehicles and this information is used to select the unmanned aerial vehicle that will perform the mission.

When charging a battery of an unmanned aerial vehicle, it is preferably to charge it with a current level and for a period of time that would be ideal for maintaining the battery's efficiency. When there is time pressure that creates a need for abnormal charging, that is, fast charging with a higher current than desired in a normal case, this damages the battery's efficiency, and shortens its life. For example, the lifespan of a particular battery can be a hundred normal charges, that is, charges in an ideal state; however, if an abnormal charge is performed, and of course depends on the parameters of that abnormal charge, then the battery's lifespan is shortened and can decrease. So, if a certain battery has eighty normal charges left, for example, then if it is charged with an abnormal charge, its lifespan is shortened not to seventy-nine, but to seventy, for example. Everything of course depends on the type of battery, and the parameters of that abnormal charging.

The present invention therefore refers to the system (1) for selecting an unmanned aerial vehicle (100) for executing the certain mission from a plurality of available unmanned aerial vehicles (200) that are available to perform that certain mission and for charging the battery (110) of the selected unmanned aerial vehicle with a specific abnormal charging profile, wherein the selection of the selected unmanned aerial vehicle is based on the history of the abnormal electric charges of those available vehicles.

The system (1) includes:

(a) A landing platform (2) that is suitable for the landing of the selected unmanned aerial vehicle. In general, the landing platform can be of a standard kind of known landing platform for unmanned aerial vehicles.

(b) An electric charger (3) that can be integrated in the landing platform (2) or nearby and that is designed to charge the battery (110) of the selected unmanned aerial vehicle (100). The electric charger is designed to charge the battery with a specific abnormal charging profile that is selected from a plurality of optional specific abnormal charging profiles that the charger can perform.

(c) A database (4) that can be stored on a memory means (5) and that include information regarding past electric charges including past abnormal charges of each of the plurality of unmanned aerial vehicles that are available to perform the certain mission.

(d) A computer processing controller (6) that is designed to control the electric charger and to determine the specific abnormal charging profile in which the electric charger is designed to charge the battery of the selected unmanned aerial vehicle. The computer processing controller can also serves as the memory means (5) on which the database is stored.

The computer processing controller (6) is designed to select the selected unmanned aerial vehicle from the plurality of unmanned aerial vehicles that are available to perform the certain mission according to the information of the past electric charges including the past abnormal charges of each of the plurality of unmanned aerial vehicles.

The selection of the unmanned aerial vehicle can be based on the needs of the operator. For example, if the operator prefer to end the life of a battery that is about to expire, then the system can select an unmanned aerial vehicle whose battery is on the verge of ending. If the operator prefers not to bother with replacing batteries in the near future, for all sorts of operator considerations, then the system will choose an unmanned aerial vehicle whose battery life is long enough to survive abnormal charging.

The information about the charges including the abnormal charges of the unmanned aerial vehicles can be sent to the system through a control center (7) directly or through the unmanned aerial vehicles themselves, and also, the system can receive commands and information from the control center regarding the necessary charging profile, including in terms of the time period in which the charging must be completed, the amount of energy needed to be in the battery, and similar data needed to determine the charging profile.

The system can also be designed to detect increased energy consumption of the unmanned aerial vehicles, by measuring an initial battery state before performing a certain task, measuring a final battery state after performing the task, possible by weighing the weather and cargo that the unmanned aerial vehicle carried with it, and comparing the energy consumption compared to the normal energy consumption of such unmanned aerial vehicle for the aforementioned task, and when an abnormal deviation beyond a certain rate is measured, then this is an indication that the unmanned aerial vehicle or its battery should be checked and the system sends can alert to a control center.

Figure 2:
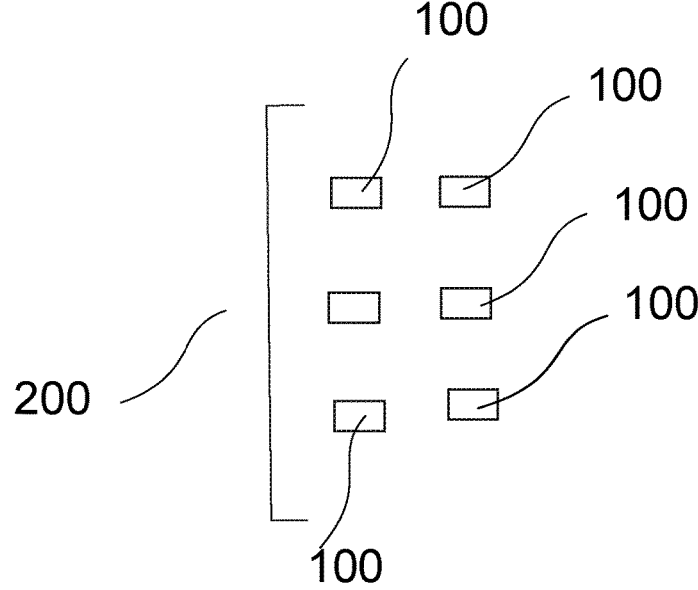
FIG. 2 depicts schematically the plurality of the unmanned aerial vehicles.

FIG. 1 depicts schematically the system (1) with the landing platform (2) and the selected unmanned aerial vehicle (100), and FIG. 2 depicts schematically the plurality of the unmanned aerial vehicles.

The system also stores data on each aerial vehicles and on each battery of the aerial vehicles, including the charging rate of the battery, and the battery consumption when performing certain tasks, and according to the comparison of this data with data on the charging rate in the past and the battery consumption when performing similar tasks in the past, the system predicts the state of the battery including expected faults.

What is claimed is:

1. A computer-implemented method for selecting an unmanned aerial vehicle (UAV) from a plurality of available UAVs and for charging a battery of a selected UAV, the method comprising:

(a) identifying, by one or more processing devices, a requirement to perform a mission within a threshold time period necessitating an abnormal charging profile that exceeds standard charging current parameters;

(b) accessing, by the one or more processing devices, a database containing historical data for each of a plurality of available UAVs, the historical data including past abnormal electric charges for each available UAV;

(c) determining, by the one or more processing devices, a specific abnormal charging profile capable of charging a battery to a required level within the threshold time period;

(d) selecting, by the one or more processing devices, a selected UAV from the plurality of available UAVs by comparing the past abnormal electric charges of each available UAV against a battery lifespan threshold; and (e) applying, via an electric charger, the specific abnormal charging profile to the battery of the selected UAV.

2. A system for managing a fleet of unmanned aerial vehicles (UAVs), the system comprising:

a landing platform;

an electric charger;

one or more processing devices; and a memory means storing instructions that, when executed by the one or more processing devices, configure the system to:

(i) detect a mission requirement and a threshold time period for mission readiness;

(ii) determine a specific abnormal charging profile required to meet the threshold time period;

(iii) retrieve from a database a count of past abnormal electric charges for each of a plurality of available UAVs;

(iv) select a specific UAV from the plurality of available UAVs based on the count of past abnormal electric charges relative to an expected battery lifespan; and (v) operate the electric charger to charge a battery of the specific UAV using the determined specific abnormal charging profile.

\* \* \* \* \*